United States Patent [19]

Tsuyama

[11] Patent Number: 4,477,865
[45] Date of Patent: Oct. 16, 1984

[54] MOUNTING DEVICE FOR LIGHTING DEVICE FOR BICYCLE

[75] Inventor: Sadaharu Tsuyama, Osaka, Japan
[73] Assignee: Tsuyama Manufacturing Company, Ltd., Japan
[21] Appl. No.: 543,498
[22] Filed: Oct. 19, 1983
[51] Int. Cl.³ .............................................. F21V 21/00
[52] U.S. Cl. ................................ 362/396; 248/231.2; 248/231.4; 248/316.4; 362/72; 362/190; 362/191; 362/289; 362/418; 362/430
[58] Field of Search ................. 362/72, 396, 190, 191, 362/289, 418, 430; 248/225.3 A, 225.3, 226.1, 316 R, 316 A, 316 C

[56] References Cited

U.S. PATENT DOCUMENTS

| | | | |
|---|---|---|---|
| 632,858 | 9/1899 | Waibel et al. | 362/72 X |
| 4,170,337 | 10/1979 | Davis | 362/72 X |
| 4,390,927 | 6/1983 | Von Feldt | 362/72 |

Primary Examiner—Stephen J. Lechert, Jr.
Attorney, Agent, or Firm—Allegretti, Newitt, Witcoff & McAndrews, Ltd.

[57] ABSTRACT

A mounting device for a lighting device for a bicycle comprises a base having a horizontally fixed portion, and a pair of vertical portions extending from opposing sides of the horizontally fixed portion, each vertical portion having an elongated bearing slot in opposing relation, the base being fixed to the lighting device, the base including an upright member fixed between the vertical portions, the upright member containing a through hole, a slidable shaft member bridged between the bearing slots of the vertical portions of the base, the slidable shaft member being freely movable in a longitudinal direction, a slider having a threaded hole and end portions, the end portions cooperating with the slidable shaft member so that the slider is held perpendicular to and between the vertical portions, an adjustment screw inserted into the through hole of the upright member on the base so that its end may be adjustably engaged with the threaded hole of the slider, the adjustment screw having a head, a first fastening arm having one end which is inserted between the head of the adjustment screw and the through hole of the upright member on the base, a second fastening arm having one end rotatably fixed on the slidable shaft member and means for fastening the first and second fastening arms to secure the lighting device upon a bicycle. The mounting device also includes a positioning pin having both ends fixed between lower end portions of the vertical portions of the base for abutting against an inner face of the second fastening arm when assembled.

4 Claims, 5 Drawing Figures

MOUNTING DEVICE FOR LIGHTING DEVICE FOR BICYCLE

BACKGROUND OF THE INVENTION

This invention relates to a mounting device for a lighting device for a bicycle or like vehicle and more particularly, to a mounting device which has an inner effective circumferential dimension adjustment mechanism for various diameters of pipes of the bicycle handlebar on which the mounting device is mounted.

In a preferred embodiment, the mounting device for a lighting device for a bicycle comprises a base having a horizontally fixed portion and a pair of vertical portions extending from opposing sides of the horizontally fixed portion, each vertical portion having a horizontal bearing slot in opposing relation, the base being fixed to the lighting device, the base including an upright member fixed between the vertical portions, the upright member containing a through hole; a slidable shaft member bridged between the bearing slots of the vertical portions of the base, the slidable shaft member being freely movable in horizontal direction; a slider having a threaded hole and end portions, the end portions cooperating with the slidable shaft member so that the slider is held perpendicular to and between the vertical portions; an adjustment screw inserted into the through hole of the upright member on the base so that its end may be adjustably engaged with the threaded hole of the slider, the adjustment screw having a head; a first fastening arm having one end which is inserted between the screw head of the adjustment screw and the through hole of the upright member on the base; and a second fastening arm having one end rotatably fixed on the slidable shaft member and the other end forming a retaining mechanism with the other end of the first fastening arm. The mounting device also includes a positioning pin having both ends fixed between lower end portions of the vertical portions of the base for abutting against an inner face of the second fastening arm when assembled.

There is known a mounting device for a lighting device for a bicycle in which a part of pipe of the bicycle handlebar is clamped by a pair of arcuate arm members. However, such mechanism is not appropriate for a bicycle having a handlebar pipe which is of extremely small or extremely large diameter. The present invention contemplates a mounting device useful for a wide range of diameters of handlebar pipe.

SUMMARY OF THE INVENTION

In view of the above-noted defects, an object of the present invention is to provide a mounting device for a lighting device for a bicycle which has an adjustment mechanism for an inner effective circumferential dimension for enabling the mounting of the device into the pipe of bicycle handlebar having a wide range of diameters. Other objects and advantages of the present invention will become more apparent hereinafter.

BRIEF DESCRIPTION OF THE DRAWINGS

There is shown in the attached drawing a presently preferred embodiment of the present invention, wherein like numerals refer to like elements in the various views and wherein.

DETAILED DESCRIPTION OF THE PREFERRED EMBODIMENTS

Figure 1:
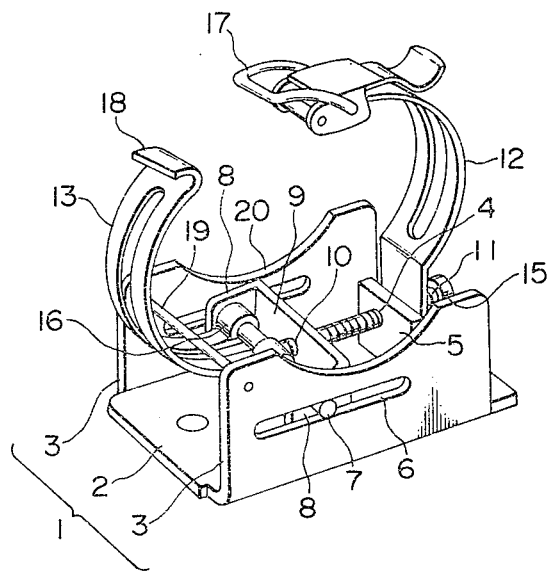
FIG. 1 is a perspective view of the mounting device according to the invention (upside down)
Figure 2:
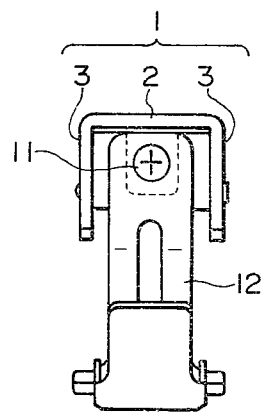
FIG. 2 is a front view of the mounting device shown in FIG. 1.

The present invention will now be described with reference to the accompanying drawings. The present invention, however, should not be restricted to the embodiment.

A base denoted by a reference numeral 1 and made of a U-shaped metal plate, for example, iron or steel, is comprised of a horizontally fixed portion 2 and vertical portions 3, 3 extending vertically from opposite sides of the horizontally fixed portion 2. A lower surface of the horizontally fixed portion 2 (which is an upper surface in the assembled state) is fixed to a bottom surface of a lighting device so that the fastening device is mounted integrally with the lighting device. An upright member 5 having therein a through hole 4 is mounted fixedly on the base 1 perpendicularly to the vertical portions 3, 3. The top of member 5 abuts the horizontal portion 2 and the ends of the member 5 abut the inner surfaces of vertical portions 3.

A pair of horizontal elongated bearing slots 6, 6 are formed in the vertical portions 3,3 in a facing relation. Each end of slidable shaft member 7 is slidably inserted into a bearing slot 6. Bent fixed portions 8, 8 of a slider 9 are fixed inside the slidable shaft member 7 with respect to the bearing slots 6, 6. The slider 9 is disposed between the vertical portions 3,3 and is constructed and arranged so as to slide in a direction perpendicular to the vertical portions 3, 3. The slider 9 moves longitudinally of base 1. The slider 9 is horizontally moved together with the slidable shaft member 7 and thereby adjusted relative to the fixed member 5. The slider 9 is then retained fixed in its selected adjusted position. The bent fixed portions 8, 8 of the slider 9 allow both ends of the slidable shaft member 7 to be stably received in the bearing slots 6, 6. In addition, a threaded hole 10 is provided in the middle of the slider 9.

Reference numeral 11 denotes an adjustment screw, which is inserted from the through hole 4 of the upright member 5 on the base 1. The end of the adjustment screw 11 is threadedly engaged with the threaded hole 10 in the slider 9. Rotation of the adjustment screw 11 within the threaded hole 10 will cause movement of the slider 9 and hence adjustment of the slider 9 relative to upright member 5.

Reference numerals 12 and 13 denote first and second fastening arms respectively. The inner surfaces of the fastening arms 12, 13 are formed to conform with a pipe configuration of the bicycle handlebar. A through hole 14 is provided at the end of the first fastening arm 12 and is positioned between the upright member 5 containing the through hole 4, through which the adjustment screw 11 is driven, and the screw head 15 of the adjustment screw 11. One end of the second fastening arm 13 is bifurcated into two cylinderical bearing portions 16.

In assembly, a part of the slidable shaft member 7 between the bent fixed portions 8 and 8 of the slider 9 is inserted into the cylindrical bearing portions 16. The first and second fastening arms 12 and 13 are respectively provided with retaining portion 17 and retained portion 18 forming one-touch engaging mechanism hitherto known. Portion 18 may comprise a hook portion on pin 13 and portion 17 may comprise a latch on the end of pin 12. Members 17 and 18 comprise means for retaining the first and second fastening arms 12 and 13.

A positioning pin 19 is provided between the upper end portions of the vertical portions 3, 3 of the base 1 (at the lower end portions when assembled). That is, the pin 19 is fixedly bridged between the vertical portions 3, 3 and proximate the ends of the bearing slots 6 on the side of the base 1, opposite to the screw head 15 of the adjustment screw 11. Further, the pin 19 is joined to the lower end portions of vertical portions 3 relatively close to the end surfaces remote from fixed portion 2. The positioning pin 19 serves to position the second fastening arm 13 while abutting against the inner side of the second fastening arm 13 when the device is assembled on the pipe of the bicycle handlebar.

The adjustment mechanism with the adjustment screw 11 will now be described in detail.

A temporary mounting is first carried out by placing the first and second fastening arms 12 and 13 onto the pipe of the bicycle handlebar. At this time, judgment is made to whether the space between the fastening arms 12 and 13 should be widened or narrowed. In case the space should be narrowed, the adjustment screw 11 is threadely advanced, whereby the end of adjustment screw 11 is advanced and projected through the slider 9, and slider 9 is moved closer to upright member 5. Upon assembly, the screw head 15, the end of the first fastening arm 12 having a hole through which screw 11 extends, and the upright member 5 are in abutment with each other. The slider 9 is moved, as the adjustment screw 11 is inserted threadedly into the threaded hole 10, towards the above described three abutment members, together with the second fastening arm 13. As a result, the space between the upper ends of the fastening arms 12 and 13 is narrowed. An inner circumferential dimension of the thus assembled mounting device corresponds to the sum of the inner circumferential dimensions of the fastening arms 12 and 13 and space between the fastening arms 12 and 13. Accordingly, as the adjustment screw 11 is threadedly advanced to narrow the space between the fastening arms 12 and 13, the mounting inner effective circumferential dimension decreases.

On the other hand, to widen the effective inner circumferential dimension, the adjustment screw 11 is rotated in a reverse direction to increase the space between the upper ends of fastening arm 12 and 13. Upon mounting the mounting device onto the pipe of the bicycle handlebar, arcuate portions 20 formed on upper peripheral portions of the vertical portions 3, 3 of the base 1 are applied from above the pipe of the bicycle handlebar to conform therewith. In this condition, the pin 19 is brought into contact with the inner surface of the second fastening arm 13 so that the pipe of the bicycle handlebar is aligned with the mounting device.

Figure 3:
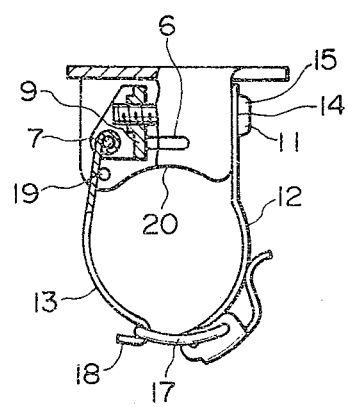
FIG. 3 is a side view of the mounting device shown in FIG. 1, with parts broken away for clarity.
Figure 4:
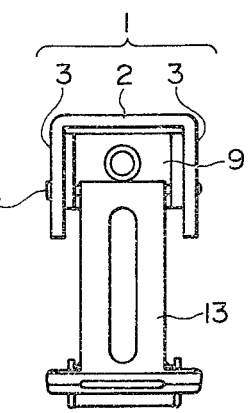
FIG. 4 is a rear view of the mounting device shown in FIG. 1.
Figure 5:
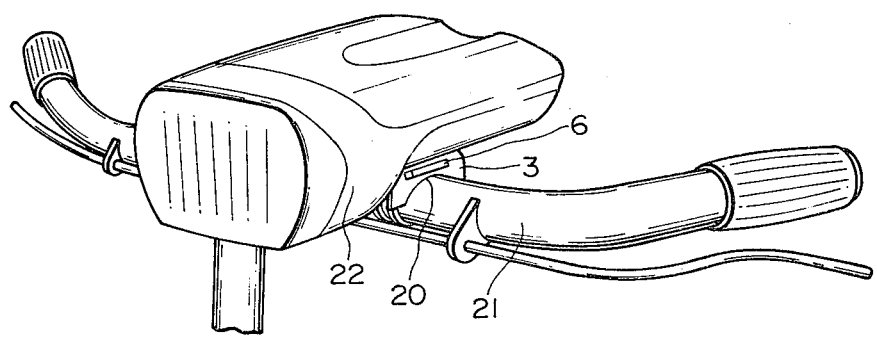
FIG. 5 is a perspective view of the mounting device shown in FIG. 1 mounted on a bicycle handlebar pipe.

As shown in FIG. 5, the lighting device 22 is mounted on the pipe 21 of the bicycle handlebar in a well-balanced condition. Arcuate portions 20 on the end surfaces of the vertical portions 3 substantially conform to the pipe 21 and arms 12, 13 are properly adjusted and locked together as shown in FIG. 3, for example, to retain the lighting device 22 on the pipe 21 of the bicycle handlebar.

The first fastening arm 12 of the mounting device may be rotated around the adjustment screw 11 to bring it to horizontal to the base 1 for compact packaging for transportation.

As has been described, according to the present invention, there has been provided a mounting device for a lighting device capable of affixing the lighting device to a wide range of diameters of the pipe of a handlebar onto which the mounting device for the lighting device is to be mounted. The mounting means is advantageously adjusted by means of an adjustment screw. The mounting device has not only adjustment capability, but also the construction allows the lighting device to be mounted in a well-balanced condition on the pipe of the bicycle handlebar. The latter function is attained in part by utilizing the positioning pin for the second fastening arm. Furthermore, when the lighting device is packaged, the first fastening arm may be positioned horizontal (or parallel to the base) thereby reducing the size for packaging.

While a presently preferred embodiment has been disclosed, it will be apparant that the invention may be otherwise embodied within the scope of the claims.

What is claimed is:

1. A mounting member for releasably holding a device for a bicycle comprising:
   a base having a horizontally fixed portion and a pair of vertical portions extending from opposing sides of the horizontally fixed portion, each vertical portion having an elongated bearing slot, the bearing slots being in opposed relation, the base being adapted to be fixed to the bottom of the device, the base including an upright member fixed between the vertical portions, the upright member containing a through hole,
   a slidable shaft member bridged between the bearing slots of the vertical portions of the base, the slidable shaft member being freely movable in a longitudinal direction,
   a slider having a threaded hole and end portions, the end portions cooperating with the slidable shaft member so that the slider is held perpendicular to and between the vertical portions,
   an adjustment screw inserted into the through hole of the upright member on the base so that its end may be adjustably engaged with the threaded hole of the slider, and the adjustment screw having a head at its opposite end,
   a first fastening arm having one end which is inserted between the head of the adjustment screw and the through hole of the upright member on the
   a second fastening arm having one end rotatably fixed on the slidable shaft member and first fastening arm, and
   one touch engaging means for detachably fastening the first and second fastening arms to secure the device upon a bicycle.

2. A mounting member as in claim 1 including a positioning pin having both ends fixed between end portions of the vertical portions of the base remote from the horizontally fixed portion for abutting against an inner face of the second fastening arm when assembled.

3. A mounting member as in claim 2 wherein the vertical portions are provided with arcuate portions on the ends distal from the horizontally fixed portion, said arcuate portions being adapted to abut the pipe of the bicycle handlebar.

4. A mounting member in claim 1 wherein the one touch engaging means comprises a hook on the end of one fastening arm and a latch on the end of the second fastening arm.

* * * * *